July 6, 1926.
M. BARTON
AUTOMOBILE SIGNAL
Filed April 3, 1926
1,591,355
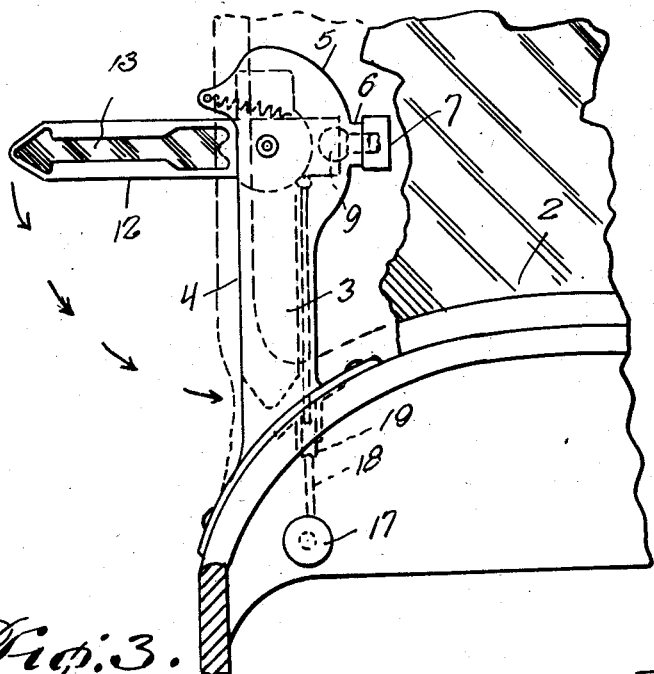
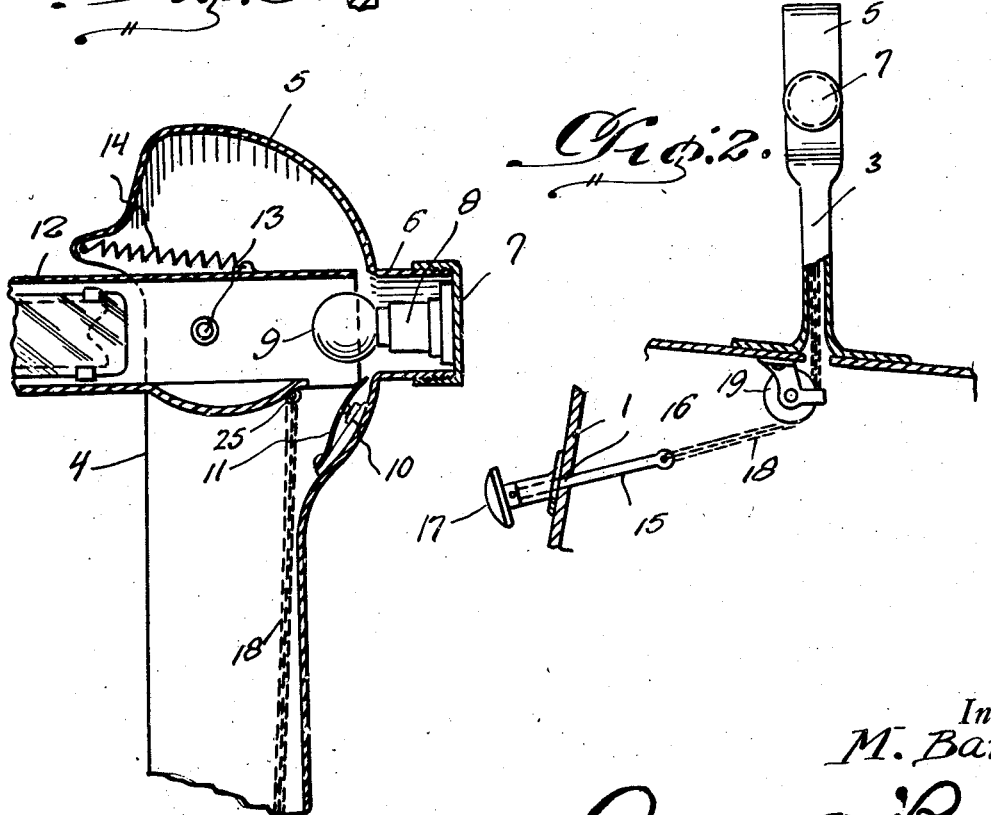
Inventor
M. Barton,
By Clarence A. O'Brien
Attorney Patented July 6, 1926.

1,591,355

UNITED STATES PATENT OFFICE.

MAX BARTON, OF WINCHESTER, IDAHO.

AUTOMOBILE SIGNAL.

Application filed April 3, 1926. Serial No. 99,568.

My present invention pertains to automobile signals and more particularly the type of signals designed for use in close proximity to the windshield of an automobile; and it has for its general object the provision of an automobile signal of simple and inexpensive construction, and one that is reliable in operation, and is susceptible of prompt operation through the medium of a pull device located within the automobile within convenient reach of the driver.

Other objects and practical advantages of the invention will be fully understood from the following description and claims when the same are read in connection with the drawings, accompanying and forming part of this specification, in which:—

Figure 1 is a fragmentary view showing a portion of an automobile and also showing my novel signal with its arm extended or in working position.

Figure 2 is a detail view, partly in elevation and partly in section, taken at right angles to Figure 1.

Figure 3 is an enlarged fragmentary vertical section taken in a plane parallel to Figure 1.

Similar numerals of reference designate corresponding parts in all of the views of the drawings.

I show in Figures 1 and 2, the instrument board 1 of an automobile, and I also show in Figure 1 the windshield 2 of the automobile, adjacent to which is fixed the upright housing member 3 of my improvement. The said housing member 3 may be and preferably is formed of sheet metal and is open at its outer side as designated by 4 in Figure 3, and is provided with a hood 5 at its upper end, and is also provided at its inner side with a lateral tubular projection 6, normally closed by a cap 7, threaded or otherwise secured on the said portion 6, and this detachably so that the lamp socket 8 and the lamp 9 carried by the said cap 7 may be readily reached when it is necessary to replace the lamp 9 with a fresh lamp.

As best shown in Figure 3, the housing member 5 is provided interiorly with a fixed terminal 10, electrically connected with the filament of the lamp 9; and in this connection it will also be noticed that the housing member 5 is provided with a spring terminal 11 also electrically connected with the filament of the lamp 9 and arranged to normally rest out of contact with the terminal 10. The signal arm of my improvement is designated by 12, and it will be understood that when the said signal arm 12 is in pendent position and fully contained in the housing member 4, the terminal 11 will rest out of contact with the terminal 10, and hence the filament of the lamp 9 will be idle. When however, the signal arm 12 is moved to the working position shown in Figures 1 and 3, it will be manifest that an inner corner of the said signal arm 12 by acting on the spring terminal 11 will force and hold the spring terminal 11 in contact with the terminal 10, with the result that the circuit including the filament of the lamp 9 will be completed and the said filament will be caused to glow with the result that the arm 12 will be illuminated for the better display of the glazed panel 13 which is made in simulation of an arrow, and, it will be understood in this connection that the signal arm 12 which is hollow, may be provided with any symbol or word that is to be illuminated when the signal arm 12 is moved to the working position shown in Figures 1 and 3. The signal arm 12 is pivotally mounted in the housing member 4 at the point 13, and a retractile spring 14 is interposed between and connected to the hood 5 and the arm 12 so that when the arm 12 is released, the spring 14 will operate to promptly return the arm 12 to pendent position in the housing 4 and to yieldingly retain the arm 12 in the housing 4 so as to protect said arm 12 and avoid unnecessary exposure of the same to the weather.

For the convenient manipulation of the signal arm 12, I employ a rectilinearly movable pull device 15, guided at 16 in the instrument board 1 and provided with a handle 17. A cable 18 of appropriate type is carried about a sheave 19 supported in the automobile, and is connected at one end to the signal arm 12 as indicated by 20, and is connected at its opposite end to the forward end of the pull device 15.

It will be understood from the foregoing that normally the signal arm 12 rests in pendent position in the housing 4. When, however, the driver of the automobile pulls rearwardly on the device 15, the arm 12 will be swung to the position shown in Figures 1 and 3 against the action of the spring 14, and so as to adequately indicate the intention of the driver of the automobile with respect to a proposed left turn or for any other purpose. When, however, the pull device 15 is released by the driver of the automobile, the spring 14 will operate to promptly return the arm 12 to a pendent position in the housing 4. In performing this function it will be appreciated that the spring 14 is assisted by gravity, and therefore, I would have it understood that when the outer and comparatively long arm of the member 12 is sufficiently heavy, the spring 14 may be altogether omitted.

In the position of the arm 12 shown in Figures 1 and 3, the symbol of the arm 12 will be illuminated, but when the arm 12 is in pendent position the circuit containing the filament of the lamp 9 will be interrupted, and hence the lamp 9 will not be lighted.

I have deemed it unnecessary to illustrate the circuit containing the filament of the lamp 9, the terminals 10 and 11 and a source of electric energy inasmuch as said circuit is well known in the art, and per se is not of my invention.

It will be understood from the foregoing that the lamp socket 8 is removable with the cap 7, and hence when said cap 7 is separated from the housing 4, the lamp 9 may be removed to give place to a fresh lamp, after which the cap 7 may be expeditiously and easily replaced and secured on the tubular projection 6.

In addition to the practical advantages ascribed to my novel signal, it will be apparent that when properly embellished the signal will enhance rather than detract from the finished appearance of an automobile.

I have entered into a detailed description of the construction and relative arrangement of the parts embraced in the present and preferred embodiment of my invention in order to impart a full, clear and exact understanding of the said embodiment. I do not desire, however, to be understood as limiting myself to the precise construction disclosed, my invention being defined by my appended claims within the scope of which modifications may be made without departure from my invention.

Having described my invention, what I claim and desire to secure by Letters-Patent, is:—

1. In combination, a pull device mounted in an automobile body, an upright housing fixed on said body and open at its outer side and having a hood at its upper end, a swingable signal arm pivoted in and to the housing, and an appropriately guided cable interposed between and connected to the pull device and the signal arm.

2. In combination, in an automobile signal, a housing open at one side and having a hood at its upper end and also having at its inner side a lateral tubular projection, a cap secured on and closing said projection, a socket for an incandescent electric lamp carried by and removable with said cap, an incandescent electric lamp carried by said socket, a hollow signal arm pivoted in the housing and arranged when swung from working position to outer position and vice versa to clear the said lamp, and manually operable means for moving said hollow signal arm to working position.

In testimony whereof I affix my signature.

MAX BARTON.